WILLIAM BEAUCHAMP.
Improvement in Hubs and Spokes.
No. 119,557.   Patented Oct. 3, 1871.
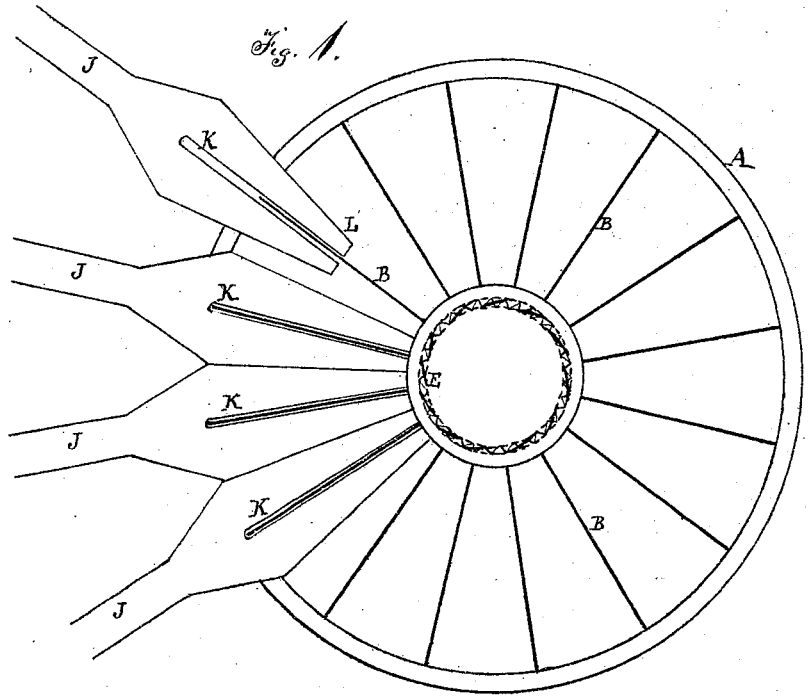
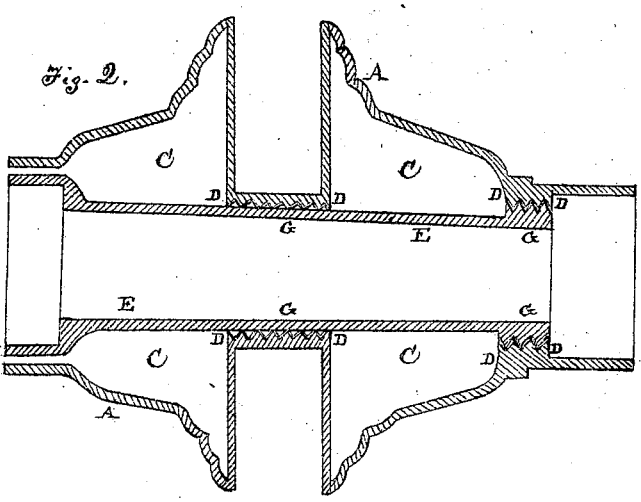

ND. 119,557

UNITED STATES PATENT OFFICE.

WILLIAM BEAUCHAMP, OF GRAYVILLE, ILLINOIS.

IMPROVEMENT IN HUBS AND SPOKES.

Specification forming part of Letters Patent No. 119,557, dated October 3, 1871.

*To all whom it may concern:*

Be it known that I, WILLIAM BEAUCHAMP, of Grayville, White county, State of Illinois, have invented a new and useful Improvement in Hubs and Spokes of Carriage-Wheels; and I do hereby declare the following to be an exact description thereof, reference being had to the accompanying drawing and to the letters of reference marked thereon making a part of this specification, in which—

Figure 1 represents a side view of the hub with its several spokes attached, showing the mode of securing the spokes to the hub by the slits of the spokes fitting upon the flanges of the hub. Fig. 2 shows a longitudinal section of the hub with its cylinder or axle-box in the inside.

The nature of my invention consists in the construction and combination of the hollow cast-metal hub A with its straight flanges B B, inside screw-threads D D and corresponding screw-box E, and slits K of the spokes J fitting upon the flanges B.

To enable others skilled in the art to make and use my invention, I will proceed to describe its construction and operation, as follows:

A represents the hub, with its central flanges B B cast solid with the center of the hub, while the remaining part of the hub is hollow, and cored out at C C as a mere shell, so that the hub is made of less metal and very light in weight, particularly suitable for light carriages or vehicles. In the inside of the hub are screw-threads, cut at D D. The axle-box E has corresponding screw-threads cut on its projecting rings G G, which not only secures the box when screwed into the hub, but also prevents any dirt from getting into the hollow parts C C of the hub; and when the box is worn it can easily be unscrewed and removed for the purpose of inserting a new box. The flanges B B are made thin, straight, and evenly cast, all of the same size and thickness from top to bottom, and each spoke J has a slit or opening, K, sawed in it, of the same length and width to correspond with the shape and size of the flange B, so that the slit K will fit evenly and closely upon the flange B. The ends L of the spokes being all tapered alike fit and set closely and firmly together, without any shrinking or rattling, and the wheel is perfectly tight and free from any rattling noise, having decided advantages over the spokes of wheels set between the flanges.

What I claim as my invention, and desire to secure by Letters Patent, is—

1. The construction of the hollow hub A with its straight flanges B, inside screw-threads D D, and corresponding screw-box E, when constructed and combined as herein described and set forth.

2. The slits K as sawed in the spokes J, when constructed to fit closely upon the flanges B, as herein described and for the purposes set forth.

WILLIAM BEAUCHAMP.

Witnesses:
J. FANKLIN REIGART,
EDM. F. BROWN.